April 2, 1946.                H. M. LEWIS                2,397,746
                      WAVE-SIGNAL DIRECTION FINDER
                   Filed May 23, 1942           2 Sheets-Sheet 1
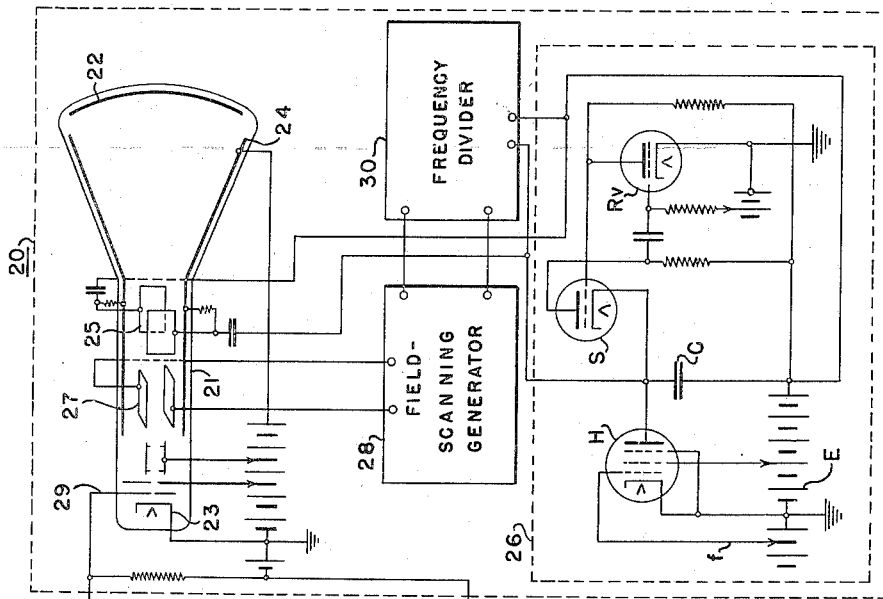
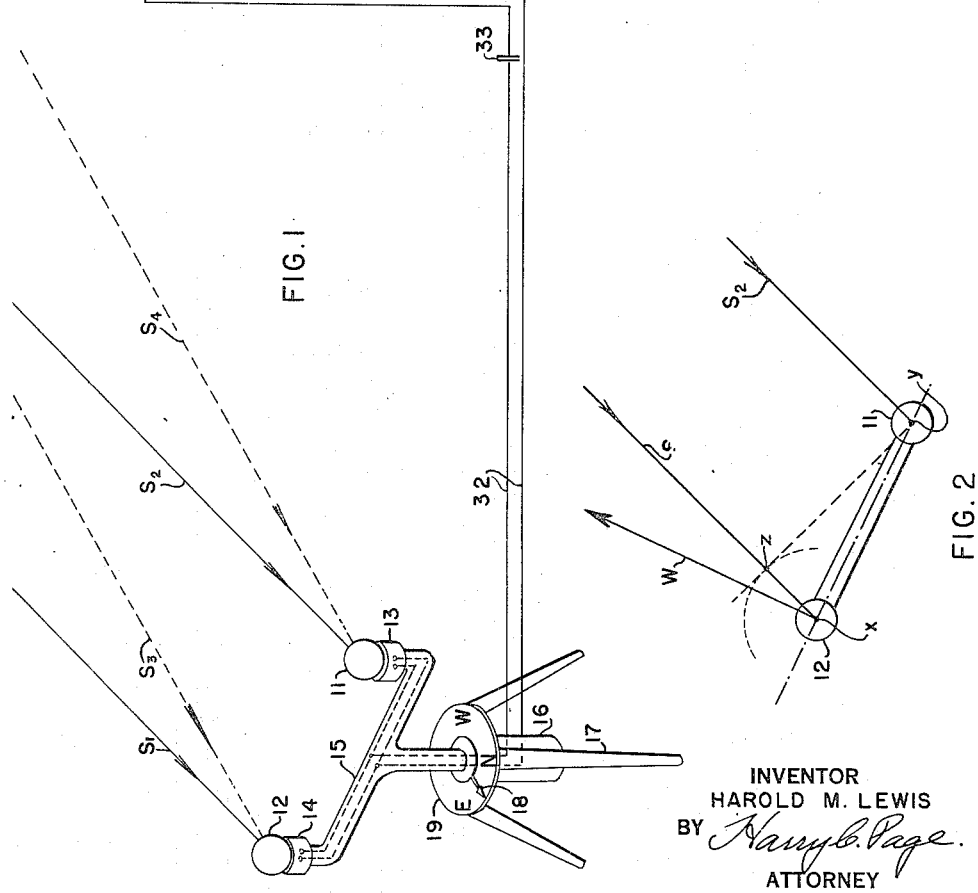
INVENTOR
HAROLD M. LEWIS
BY *Harry C. Page*
ATTORNEY April 2, 1946.   H. M. LEWIS   2,397,746
WAVE-SIGNAL DIRECTION FINDER
Filed May 23, 1942   2 Sheets-Sheet 2
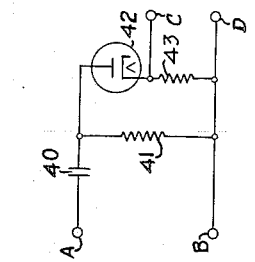
FIG. 7
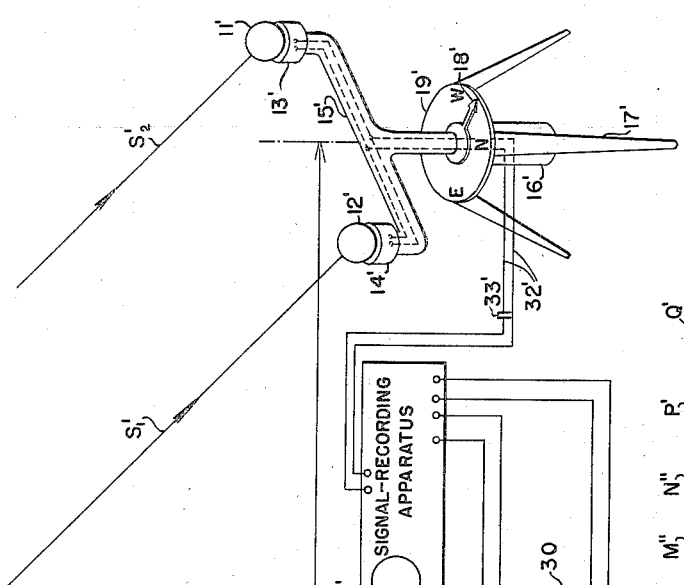
FIG. 6
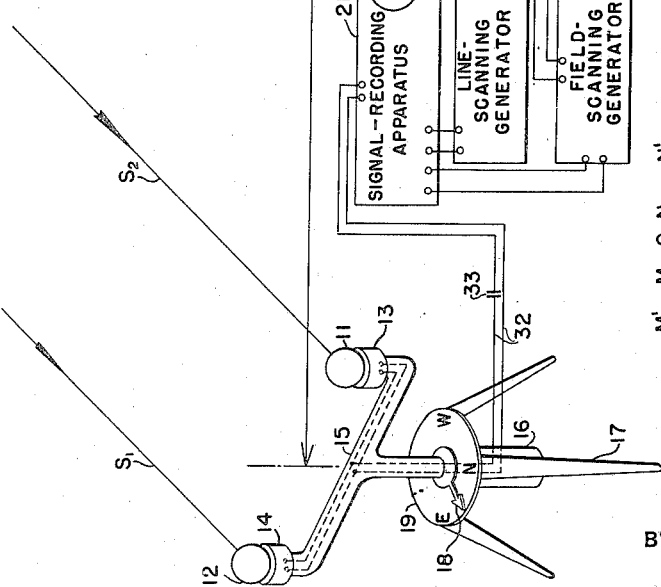
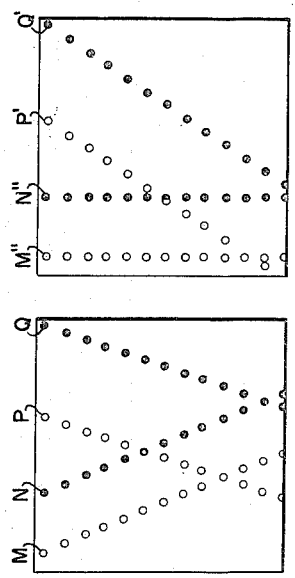
FIG. 5
FIG. 4
FIG. 3
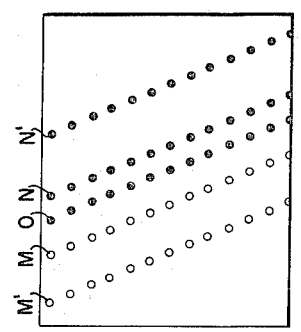
INVENTOR
HAROLD M. LEWIS.
BY Harry C. Page
ATTORNEY Patented Apr. 2, 1946

2,397,746

UNITED STATES PATENT OFFICE 2,397,746

WAVE-SIGNAL DIRECTION FINDER

Harold M. Lewis, Allenhurst, N. J., assignor to Hazeltine Corporation, a corporation of Delaware Application May 23, 1942, Serial No. 444,193

20 Claims. (Cl. 177—352)

This invention relates to direction finders and, more particularly, to direction finders of a type adapted to indicate the direction of a source of radiated wave signals.

A wave signal radiated from a source travels with a constant velocity and reaches listening posts or pick-up devices in the field of radiation with a time displacement determined by the relative orientation or difference in distance of the pick-up devices with reference to the source. If the spacing between the pick-up devices is negligible in comparison with their spacing from the signal source, it may be assumed to a first approximation that the signals travel in parallel paths from the source to the pick-up devices. Based upon this assumption, it is possible to determine the direction of the source with reference to the pick-up devices from the time displacement of the signals picked up thereby. Further, by using several groups of pick-up devices, which groups are spaced a predetermined distance apart, the location of the signal source may be determined. These principles have long been employed in the sound-ranging art and have also been embodied in direction finders utilized to locate high-frequency signal sources.

Thus, these prior-art arrangements frequently comprise means for indicating the phase-displacement of a signal received by a plurality of spaced pick-up devices. While arrangements of this type are satisfactory for certain applications, they do not provide a type of indication which is satisfactory under all conditions of operation. For example, when such prior-art arrangements receive signals radiated from a plurality of sources, it is not possible, under certain conditions, to determine the direction of a particular one of the sources with reference to the pick-up devices without supplementary and costly differentiating equipment.

It is an object of the invention, therefore, to provide an improved arrangement for determining the direction of a source of radiated signals which avoids one or more of the above-mentioned disadvantages of the prior-art arrangements.

It is a further object of the invention to provide an improved arrangement for determining the direction of a particular one of a plurality of sources of radiated periodic signals.

In accordance with the present invention, a direction finder for determining the direction of a source of radiated wave signals comprises a plurality of spaced pick-up devices individually adapted to pick up the signals with a time-displacement determined by the relative orientation, or the relative distances, of the devices with reference to the source. The direction finder also comprises a signal-indicating apparatus including means for scanning a predetermined area and for producing within this scanned area an indication of any signal applied to the indicating apparatus over a period of time considerably longer than the period of the applied signal. The position of the indication within the scanned area is determined by the time of application of the signal with reference to the scanning of the area. Means are provided for applying the wave signals picked up by the devices to the apparatus to cause the apparatus to produce a two-dimensional signal pattern determined by the time displacement of the applied signals and representing the relative orientation of the devices with reference to the direction of the source or the direction of the source from the direction finder.

As used in this specification the term "relative distances" is intended to mean "difference in distance."

In accordance with a feature of the invention the direction of a particular one of a plurality of radiated periodic signals is determined. To this end the pick-up devices of the above-described arrangement are individually adapted to pick up each of the radiated signals, whereby the indicating apparatus produces a plurality of signal patterns individually determined by the relative orientation of the devices with reference to the direction of one of the plurality of sources, and means are provided for adjusting the indicating apparatus to cause the apparatus to produce a predetermined signal pattern determined by the relative orientation of the devices with reference to the particular one of the plurality of sources.

In accordance with a further feature of the invention, an arrangement for determining the location of a source of radiated wave signals comprises, a first plurality and a second plurality of pick-up devices, spaced a predetermined distance apart and associated with a signal-indicating apparatus as described above, whereby the apparatus is caused to produce a pair of signal patterns individually representing the relative orientation of the devices of each plurality with reference to the direction of the source.

This invention may be employed for determining the direction of any source of radiated periodic signals, but is particularly adapted for determining the direction of a machine gun that is firing at a substantially constant firing rate, Such a gun is a source of radiated periodic signals of pulse wave form which may be received by the spaced pick-up devices and applied to the indicating apparatus to produce the above-discussed signal patterns. In this connection it will be understood that the direction finder of this invention is also peculiarly adapted to determine the direction of a particular one of a plurality of machine guns which have firing rates so related to one another that frequency-selective arrangements are not capable of separating the radiated signals.

For a better understanding of the invention, together with other and further objects thereof, reference is had to the following description taken in connection with the accompanying drawings, and its scope will be pointed out in the appended claims.

Fig. 1 of the drawings is a circuit diagram, partly schematic, of a direction finder in accordance with the invention which is used for determining the direction of a source of radiated periodic signals; Fig. 2 is a schematic diagram of a portion of the arrangement of Fig. 1 utilized in explaining the operation of that arrangement of the invention; Figs. 3, 4, and 5 represent signal patterns produced by the arrangement of Fig. 1 under various operating conditions; Fig. 6 represents a modified arrangement of the invention; and Fig. 7 is a circuit diagram of a peak-rectifying means which may be included in the arrangements of Figs. 1 and 6 to facilitate locating the source of a radiated signal having a sinusoidal or similar wave form.

Referring now more particularly to the drawings there is illustrated in Fig. 1 a direction finder in accordance with the invention for determining the direction of a source of radiated periodic signals comprising a plurality of spaced pick-up devices individually adapted to pick up the signals with a time-displacement determined by the relative orientation of the devices with reference to the direction of the source. Specifically the arrangement comprises a pair of microphones or sound-signal pick-up devices 11 and 12, the output circuits of which are individually coupled to adjustable gain amplifiers 13 and 14, respectively, which comprise means for distinguishing the output signals of each of the pick-up devices. The pick-up devices and their associated amplifiers are suitably secured to the opposite ends of a hollow T-shaped supporting standard 15 whereby the pick-up devices are spaced a predetermined distance apart. The spacing of the pick-up devices with reference to one another is negligible in comparison with their distance from the source of radiated periodic signals and thus the parallel arrows $S_1$, $S_2$, representing a signal received by the pick-up devices 12 and 11, respectively, indicate the relative orientation of the devices, or the relationship of the line of centers of the devices, with reference to the direction of this particular signal source.

The arrangement also comprises a signal-indicating apparatus 20 including means for indicating signals applied thereto, over a period of time considerably longer than the period of the applied signals, in a two-dimensional signal pattern determined by the time-displacement of the applied signals. In particular, the recording apparatus is of the cathode-ray type including a screen, means for producing an electron beam and for causing the beam to scan the screen in a two-dimensional pattern, and means including a control electrode for modulating the beam in accordance with signals applied to the apparatus. The cathode-ray tube 21 thus includes a fluorescent screen 22, a control electrode 29, and an electrode system comprising cathode 23 and anode 24 for producing an electron beam and accelerating it to the screen 22 in a well-known and conventional manner. A pair of electrostatic deflecting plates 25, to which saw-tooth scanning waves generated in a line-scanning generator 26 are applied, serve to deflect the electron beam in a first direction at a predetermined line-scanning frequency and a second pair of electrostatic deflecting plates 27, to which scanning waves generated in field-scanning generator 28 are applied, serve to deflect the beam in a second direction normal thereto at a predetermined field-scanning frequency, whereby the beam is caused to scan the screen 22 in a series of fields of parallel lines. For the particular arrangement under consideration, deflecting plates 25 and 27 deflect the electron beam in horizontal and vertical directions, respectively.

Means are provided for adjusting the signal-indicating apparatus and to this end the line-scanning generator 26 includes means for adjusting the frequency of the saw-tooth scanning voltage supplied thereby to the electrostatic deflecting plates 25 to adjust the line-scanning frequency of the apparatus 20. Thus, the line-scanning generator 26 may comprise any conventional oscillator adapted to generate a scanning voltage of saw-tooth wave form and variable frequency. It is preferred, however, that line-scanning generator 26 be of the type disclosed in Fig. 14 of United States Letters Patent No. 2,052,183 issued to H. M. Lewis and M. Cawein on August 25, 1936. In the drawings the elements of generator 26 bear reference letters corresponding to those of the oscillator disclosed in Fig. 14 of the above-identified patent. It may be seen that this generator comprises a condenser C which is charged by battery E through a constant-current device H. A vacuum tube S is coupled across condenser C and the input circuit of a feed-back tube $R_v$ is coupled across the anode load of tube S, while its anode is coupled to the control electrode of the vacuum tube S.

The field-scanning generator 28 may also comprise an oscillator of the type above-described. A frequency divider 30, to which the output signal of line-scanning generator 26 is applied, is coupled to the field-scanning generator 28 properly to synchronize the scanning voltages applied to the cathode-ray tube 21, in a well-known manner.

In order that the indicating apparatus 20 may produce a signal pattern representing the relative orientation of the devices 11, 12 with reference to the direction of the signal source, means are included in the arrangement of Fig. 1 for applying the signals picked up by each of the devices 11, 12 to the control electrode 29 of the indicating apparatus. For this purpose, the output signals of the devices, after being selectively amplified in amplifiers 13 and 14, are applied by way of conductors 32, 32 and coupling condenser 33 to the control electrode 29 of the cathode-ray tube 21.

In considering the operation of the arrangement as thus far described, it will be assumed that the parallel arrows $S_1$, $S_2$, represent a signal of pulse wave form having a predetermined periodicity radiated from a source whose direction it is desired to determine. Further, it will be assumed that line-scanning generator 26 is adjusted so that the line-scanning frequency of apparatus 20 is not substantially different from an integral multiple of the periodicity of the received radiated signal. In operation, it will be seen that, when the voltage across condenser C has reached a predetermined value, tube S becomes conductive. The voltage drop across the anode load of tube S applies a negative voltage pulse to the control electrode of the feed-back tube $R_v$ which, in turn, applies a positive pulse to the control electrode of tube S increasing its conductivity and causing a rapid discharge of the condenser C. Thus, a saw-tooth voltage wave is developed across condenser C. The frequency of the developed voltage is controllable by adjustments of the tap $f$, as explained in the reference patent and it will be understood that generator 26 is preferably a calibrated oscillator including means (not shown) for indicating the frequency of the generated oscillations. The orientation of the pick-up devices with reference to the direction of the source is, under the conditions assumed, such that one, namely microphone 11, is closer to the signal source than the other. Thus, the radiated signal is received by pick-up device 11 a predetermined period of time before it is received by device 12 whereby there is applied to the control electrode 29 of the indicating apparatus 20 a succession of spaced pairs of signal pulses having a periodicity corresponding to the periodicity of the received radiated signals and having a spacing indicative of the phase delay of the signal as received by the pick-up devices. This succession of pairs of signal pulses modulates the electron beam of the scanning apparatus as it scans screen 22 thereof in a series of fields of parallel lines, whereby there is produced in a field on screen 22 a two-dimensional signal pattern, represented in Fig. 3, comprising a plurality of parallel rows of signal indicia M, N representing the relative orientation of the pick-up devices with reference to the direction of the assumed signal source. It will be understood that screen 22 bears a suitable calibration (not shown) whereby the linear separation of the rows of signal indicia may be easily determined. Knowing the line-scanning frequency of the recording apparatus, the phase delay of the signal as received by the pick-up devices may be easily computed from the separation of the rows of signal indicia from which the direction of the signal source with reference to the pick-up devices may be determined, in a manner presently to be described.

In Fig. 2, the pick-up devices 11 and 12 are again represented, the spacing therebetween being represented by the known distance $x-y$. Knowing the phase delay of the signal received by the pick-up devices and the velocity of wave propagation under any given operating conditions, the difference in the distances of the microphones from the signal source may be computed. Using this distance as a radius and the point $x$ as a center, a circle is drawn and a tangent drawn to that circle from the point $y$, thereby determining the point $z$ of Fig. 2 and defining the direction right-triangle $xyz$. The hypotenuse $x-y$ and the side $x-z$ of the triangle have known values from which the angle $zxy$ may be determined. The line $x-y$ of the microphone has a given direction with reference to north as indicated by the direction arrow $w$ in Fig. 2, and hence the angle $wxz$ representing the direction of the signal source with reference to north may easily be computed.

Obviously, a conjugate signal direction may be determined by scribing the circle about the point $y$ and drawing a tangent thereto from the point $x$. In order to avoid this ambiguity, one of the amplifiers 13, 14 is adjusted to have a considerably higher gain than that of the other so that each of the rows of signal indicia M, N may be definitely associated with one of the pick-up devices. In the specific arrangement under discussion, amplifier 13 is assumed to have the higher gain whereby the spots comprising the row M of signal indicia of Fig. 3 appear brighter on the screen 22 than those comprising the row N. Hence, upon inspection of the signal pattern, it may be determined that the pulses from device 11 lead those of device 12 and that the latter is the more remote from the signal source. Consequently, the angle $wxz$ of Fig. 2 represents the true direction of the signal source with reference to the pick-up devices and with reference to north.

In order to obviate the necessity for computing the direction of the signal source with reference to the pick-up devices, means are provided to enable a direct reading or indication of the direction of the signal source to be obtained. Consequently, the arrangement of Fig. 1 includes means for adjusting the relative orientation of the devices with reference to the direction of the source to cause the signal-indicating apparatus to produce a particular signal pattern representing a predetermined orientation of the devices with reference to the direction of the source. For this purpose the vertical section of the microphone support 15 is rotatably supported within a bushing 16 mounted within a tripod standard 17 which supports the entire assembly. A pointer 18 secured to the vertical portion of the support 15 and a direction scale 19 secured to the tripod 17 comprise means for obtaining from predetermined orientations of the devices with reference to the signal source a direct indication of the direction of the source.

In considering the operation of the arrangement when the orientation of the pick-up devices is rendered adjustable with reference to the direction of the signal source as just described, it will be understood that the signal pattern illustrated in Fig. 3 comprising the parallel rows of signal indicia M, N again represents the relative orientation of the pick-up devices with reference to the direction of the source. By rotating the standard 15, the relative orientation of the pick-up devices with reference to the direction of the signal source is varied, whereby the spacing of the parallel rows of signal indicia produced on screen 22 is also varied. It may be seen that as the support 15 is rotated through 360 degrees, this spacing of the rows of signal indicia varies between two limiting positions each of which represents a predetermined orientation of the pick-up devices with reference to the direction of the source. In one of these limiting positions the pulses from the pick-up devices are reproduced in superposed relation on the screen or, in other words, the parallel rows of signal indicia M, N merge into a single row of signal indicia indicated as O in Fig. 3. Such a signal pattern indicates that the pick-up devices are equidistant from the signal source and an azimuth reading obtained from scale 19 indicates the true direction of the signal source. In the other of the limiting positions the rows of signal indicia have a maximum separation as represented by the rows M', N' in Fig. 3. Such a signal pattern is obtained when the pick-up devices are in direct alignment with the direction of the signal source and in this position of the pick-up devices a direct reading may again be obtained from the scale 19 representing the azimuth direction of the source.

By way of summation, it will be seen that the direction finder of Fig. 1 for determining the direction of a source of periodic radiated wave signal comprises a plurality of spaced pickup devices 11, 12. Each device is adapted to pick up the periodic signals with a time displacement determined by the relative distances of the devices with reference to the signal source. The electrode structure of the cathode-ray tube of indicating apparatus 20 as well as the scanning generators 26 and 28 comprise means for scanning a predetermined area, namely the screen 22, and for producing within the scanned area an indication of any signal applied to the indicating apparatus over a period of time considerably longer than the period of the applied signal. The position of the resulting indication within the scanned area is determined by the time of application of the applied signal with reference to scanning of the scanned area. The coupling elements 32, 33 interposed between the pickup devices and the indicating apparatus 20 constitute means for applying the wave signals picked up by the devices 11, 12 to apparatus 20 to cause the apparatus to produce a two-dimensional signal pattern. This two-dimensional pattern is determined by the time displacement of the signals as applied from devices 11, 12 and represents the direction of the signal source with reference to the direction finder.

The above-described arrangement may also be employed for determining the direction of a particular one of a plurality of sources of radiated periodic signals. In considering the operation of the arrangement to accomplish this result, it will be assumed that the parallel broken arrows $S_3$ and $S_4$ of Fig. 1 represent a second radiated signal having a periodicity different from that of the first radiated signal and that both such signals are picked up by the devices 11 and 12. It will be clear from the above description that under this condition of operation the indicating apparatus is caused to produce a plurality of signal patterns individually representing the relative orientation of the devices 11, 12 with reference to the direction of one of the plurality of sources. Thus, as indicated in Fig. 4, the indicating apparatus produces a first signal pattern comprising parallel rows of signal indicia M, N, representing the relative orientation of the pick-up devices with reference to the direction of the first-mentioned signal, and a second signal pattern comprising the parallel rows of signal indicia P, Q, representing the relative orientation of the devices with reference to the second-mentioned signal. From these signal patterns it is possible to determine the direction of either or both of the signal sources even though the frequencies of the received signals are so closely related that the signals cannot effectively be separated by way of a frequency-selective arrangement. Thus, an advantage of the direction finder of this invention over those of the prior art becomes apparent at once for, with prior-art arrangements, when signals from a plurality of sources are being received, it is common practice to rely on a discriminator, such as a frequency-responsive arrangement, to separate the signals, radiated from the source to be located, from the other received signals.

With a plurality of such signal patterns produced on the screen, however, it is frequently difficult to identify the pattern representing a particular one of the plurality of signals, the direction of which it is desired to determine. In accordance with the present invention, however, if the periodicity of the desired signal is known, the frequency of a scanning component of the apparatus 20 can be adjusted with reference thereto whereby the apparatus is caused to produce a predetermined signal pattern representing the relative orientation of the devices with reference to the particular source. Specifically, the line-scanning generator 26 may be adjusted to cause the line-scanning frequency of the recording apparatus to be approximately an integral multiple of the periodicity of the desired signal, whereby the signal pattern produced on screen 22 representing the relative orientation of the devices 11, 12 with reference to the direction of that particular source, comprises a pair of substantially vertical and parallel rows of signal indicia M", N" as indicated in Fig. 5. From this signal pattern the direction of the particular source may be determined in a manner already described.

Obviously, in addition to adjusting the line-scanning frequency whereby the desired signal pattern is easily identified, the orientation of the pick-up devices with reference to the direction of the particular source may be varied further to modify the signal pattern for the particular source and permit a direct reading from the calibration 19 of the direction of the source. This expedient is resorted to particularly when the plurality of received signals have the same periodicity, in which case the adjustment of the line-scanning frequency causes each of the plurality of signal patterns produced on screen 22 to comprise a pair of vertical rows of signal indicia. Under this operating condition, by adjusting the orientation of the pick-up devices, the signal pattern of a particular source may readily be differentiated from the other signal patterns on the screen.

In considering the signal patterns represented in Figs. 3-5, inclusive, it will be seen that the slope of any row of signal indicia is determined by the relative periodicities of the received signal and the line-scanning component. Thus the rows M, N represent an operating condition in which the line-scanning frequency is slightly greater than an integral multiple of the periodicity of received periodic signal; rows M", N" represent an operating condition in which the line-scanning frequency is substantially equal to an integral multiple of the periodicity of the received periodic signal; and rows P, Q represent an operating condition in which the line-scanning frequency is slightly less than an integral multiple of the periodicity of the received periodic signal. It will be understood that the term "integral multiple" as used in this specification is intended to include the condition in which the integral is one or unity. However, the ratio of the line-scanning period to the period of the received signal is immaterial to the operation of the invention so long as each remains substantially constant while the observation is being made.

The indicia produced on screen 22 in a single line scan or horizontal sweep of the electron beam of indicating apparatus 20 are represented as being located on a horizontal line. Actually, the line-scanning takes place along sloping lines due to the concurrent field-scanning effect. However, in most applications the line-scanning frequency is so high with reference to the field-scanning frequency that the line-scanning operation may be considered to be along horizontal lines, as illustrated.

In Fig. 6 there is disclosed an arrangement in accordance with the present invention for determining the location of a source of radiated periodic signals. The arrangement of Fig. 6 in effect includes two direction finders of the general type illustrated in Fig. 1 and thus comprises a second plurality of spaced pick-up devices 11', 12', spaced a predetermined distance $d$ from the pick-up devices 11, 12, and comprising suitable indicating apparatus coupled thereto. Each pair of pick-up devices of Fig. 6 comprises an arrangement identical to the arrangement described in connection with Fig. 1 and corresponding elements bear the same reference numerals, the reference numerals of the elements of the second pair of pick-up devices being primed. The signal-recording means of Fig. 6 comprises a pair of synchronously operated cathode-ray type signal-indicating apparatus 21, 21', each of which has means of the type included in the arrangement of Fig. 1 for indicating the signals applied thereto in a two-dimensional signal pattern determined by the time-displacement of the applied signals. The apparatus 21 and 21' are controlled and synchronized by way of line-scanning generator 26, field-scanning generator 28, and frequency divider 30 in the manner already described in connection with the indicating apparatus 20.

In considering the operation of this arrangement, it will be assumed that the parallel arrows $S_1$ and $S_2$ represent periodic signals radiated from a source and received by devices 12 and 11, respectively, and that the parallel arrows $S_1'$ and $S_2'$ represent the same signals as received by pick-up devices 12', 11', respectively. In the manner already described, the signals picked up by each of the pairs of pick-up devices are applied to one of the indicating apparatus whereby each apparatus is caused to produce a signal pattern representing the relative orientation of the devices of one of these pairs with reference to the source. From the signal patterns thus produced the direction of the signal source with reference to each of the pluralities of pick-up devices may be computed. This direction may also be obtained by adjusting the relative orientation of each of the pairs of devices to cause the signal-indicating apparatus to produce predetermined signal patterns representing predetermined orientations of the devices of each with reference to the direction of the source from which a direct azimuth reading may be obtained by way of the calibration plates 19 and 19', in a manner fully described hereinbefore. Having determined the direction of the source with reference to two points spaced a predetermined distance $d$ apart, the distance to the source may be located by a well known method of triangulation which need not be detailed herein.

While it is preferred to employ a pair of signal-indicating apparatus in the above-described arrangement to determine the location of a signal source, it will be understood that, if desired, a single indicating apparatus may be utilized. With such an arrangement a pair of signal patterns individually representing the relative orientation of the devices of one pair with reference to the direction of the source is reproduced. Then, by adjusting the orientation of the devices of one pair, the signal patterns may conveniently be associated with each of the spaced pairs of pick-up devices and thus the direction of the source with reference to each pair of devices easily determined.

The direction finder of this invention is also capable of determining the direction of a source of a radiated periodic signal having a sinusoidal, or other wave shape, as distinguished from a pulse wave form. It is only necessary in such an application that means be associated with the pick-up devices 11, 12 for deriving periodic pulses from a received wave. To this end the output circuits of units 13 and 14 may be individually coupled to a pair of peak-rectifying means of the type illustrated in Fig. 7 which, in a manner well understood in the art, derive periodic pulses from the received signals. Each such peak rectifier may comprise a pair of input terminals A—B, a condenser 40, a leak resistor 41, a diode 42, a load resistor 43, and a pair of output terminals C—D. The values of condenser 40 and resistor 41 are so chosen as to give the rectifier circuit a time constant that is long compared with the period of the received signal. The circuit and operation of the peak rectifier of Fig. 7, per se, are well understood by those skilled in the art. Thus, the direction of a ship may readily be determined with the above-described direction finder since the ship's propeller radiates a signal having a substantially sinusoidal wave form which may be received by the pick-up devices and peak-rectified to deliver periodic pulses to the recording apparatus. It will be understood that the direction of an airplane may be determined in a similar manner.

It will also be understood that the principles of the invention are applicable to light ranging as well as sound ranging. In such case, photo cells may be substituted for the microphones in the system.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A direction finder for determining the direction of a source of radiated wave signals comprising, a plurality of spaced pick-up devices individually adapted to pick up said signals with a time-displacement determined by the relative distances of said devices with reference to said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the wave signals picked up by said devices to said apparatus to cause said apparatus to produce a two-dimensional signal pattern determined by the time displacement of said applied signals and representing the direction of said source with reference to said direction finder.

2. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the periodic signals picked up by said devices to said apparatus to cause said apparatus to produce a two-dimensional signal pattern determined by the time-displacement of said applied signals and representing the relative orientation of said devices with reference to the direction of said source.

3. A direction finder for determining the direction of a source of radiated periodic pulses comprising, a plurality of spaced pick-up devices individually adapted to pick up said pulses with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the pulses picked up by said devices to said apparatus to cause said apparatus to produce a two-dimensional signal pattern determined by the time-displacement of said applied pulses and representing the relative orientation of said devices with reference to the direction of said source.

4. A direction finder for determining the direction of a source of radiated periodic signals comprising, a plurality of spaced pick-up devices individually adapted to pick up the signals with a time-displacement determined by the relative orientation of said devices with reference to the direction of said source, means associated with said pick-up devices for deriving periodic pulses from said received signals, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying said periodic pulses to said apparatus to cause said apparatus to produce a two-dimensional signal pattern determined by the time-displacement of said applied pulses and representing the relative orientation of said devices with reference to the direction of said source.

5. A direction finder for determining the direction of a source of radiated periodic signals comprising, a plurality of spaced pick-up devices individually adapted to pick up said signals with a time-displacement determined by the relative orientation of said devices with reference to the direction of said source, peak-rectifying means associated with said pick-up devices for deriving periodic pulses from said received signals, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying said periodic pulses to said apparatus to cause said apparatus to produce a two-dimensional signal pattern determined by the time-displacement of said applied pulses and representing the relative orientation of said devices with reference to the direction of said source.

6. A direction finder for determining the direction of a source of radiated and periodic sound signals comprising, a plurality of spaced sound-signal pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the signals picked up by said devices to said apparatus to cause said apparatus to produce a two-dimensional signal pattern determined by the time-displacement of said applied signals and representing the relative orientation of said devices with reference to the direction of said source.

7. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a two-dimensional signal pattern determined by the time-displacement of said applied signals and representing the relative orientation of said devices with reference to the direction of said source, and means for causing the output signals of said devices to be distinguishable.

8. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a two-dimensional signal pattern determined by the time-displacement of said applied signals and representing the relative orientation of said devices with reference to the direction of said source, and means comprising a plurality of adjustable-gain amplifiers individually connected with said pick-up devices for causing the output signals of said devices to be distinguishable.

9. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the signals picked up by said devices to said apparatus to cause said apparatus to produce a two-dimensional signal pattern comprising a row of signal indicia for each of said devices spaced in said scanned area in accordance with the relative orientation of said devices with reference to the direction of said source.

10. A direction finder for determining the direction of a source of radiated periodic signals comprising, a plurality of spaced pick-up devices individually adapted to pick up said signals with a time-displacement determined by the relative orientation of said devices with reference to the direction of said source, a cathode-ray type signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the signals picked up by said devices to said apparatus to cause said apparatus to produce a two-dimensional signal pattern determined by the time-displacement of said applied signals and representing the relative orientation of said devices with reference to said source.

11. A direction finder for determining the direction of a source of radiated periodic signals comprising, a plurality of spaced pick-up devices individually adapted to pick up said signals with a time-displacement determined by the relative orientation of said devices with reference to the direction of said source, a cathode-ray type signal-indicating apparatus including a screen, means for producing an electron beam and for causing said beam to scan said screen in a two-dimensional pattern, means including a control electrode for modulating said beam in accordance with any signal applied to said apparatus over a period of time considerably longer than the period of said signal to produce an indication positioned on said screen in accordance with the time of application of said signal with reference to the scanning of said screen, and means for applying the signals picked up by said devices to said control electrode to cause said apparatus to produce a two-dimensional signal pattern determined by the time-displacement of said applied signals and representing the relative orientation of said devices with reference to the direction of said source.

12. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a two-dimensional signal pattern determined by the time-displacement of said applied signals and representing the relative orientation of said devices with reference to the direction of said source, and means for adjusting the relative orientation of said devices with reference to the direction of said source to cause said apparatus to produce a particular signal pattern representing a predetermined orientation of said devices with reference to the direction of said source.

13. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a two-dimensional signal pattern determined by the time-displacement of said applied signals and representing the relative orientation of said devices with reference to the direction of said source, means for adjusting the relative orientation of said devices with reference to the direction of said source to cause said apparatus to produce a particular signal pattern representing a predetermined orientation of said devices with reference to the direction of said source, and means for obtaining from said predetermined orientation a direct indication of the direction of said source.

14. A direction finder for determining the direction of a source of radiated periodic signals comprising, a plurality of spaced pick-up devices individually adapted to pick up said signals with a time-displacement determined by the relative orientation of said devices with reference to the direction of said source, a signal-indicating apparatus including means for scanning a predetermined area and for producing within said area an indication of any signal applied to said apparatus over a period of time considerably longer than the period of said signal, the position of said indication within said area being determined by the time of application of said signal wth reference to the scanning of said area, means for applying the signals picked up by said devices to said apparatus to cause said apparatus to produce a two-dimensional signal pattern comprising a plurality of parallel rows of signal indicia representing the relative orientation of said devices with reference to the direction of said source, and means for adjusting the relative orientation of said devices with reference to the direction of said source to cause said apparatus to produce a particular signal pattern comprising a single row of signal indicia for said plurality of rows and representing a predetermined orientation of said devices with reference to the direction of said source.

15. A direction finder for determining the direction of a source of radiated periodic signals comprising, a plurality of spaced pick-up devices individually adapted to pick up said signals with a time-displacement determined by the relative orientation of said devices with reference to the drection of said source, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a two-dimensional signal pattern comprising a plurality of parallel rows of signal indicia representing the relative orientation of said devices with reference to the direction of said source, and means for adjusting the relative orientation of said devices with reference to the direction of said source to cause said apparatus to produce a particular signal pattern comprising a plurality of parallel rows of signal indicia having maximum separation and representing a predetermined orientation of said devices with reference to the direction of said source.

16. A direction finder for determining the direction of a particular one of a plurality of sources of radiated periodic signals comprising, a plurality of spaced pick-up devices individually adapted to pick up each of said signals with a time-displacement determined by the relative orientation of said devices with reference to the direction of each of said plurality of sources, a signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a plurality of two-dimensional signal patterns determined by the time-displacement of said applied signals and individually representing the relative orientation of said devices with reference to the direction of one of said plurality of sources, and means for adjusting said apparatus to cause said apparatus to produce a predetermined signal pattern representing the relative orientation of said devices with reference to the direction of said particular one of said plurality of sources.

17. A direction finder for determining the direction of a particular one of a plurality of sources of radiated periodic signals comprising, a plurality of spaced pick-up devices individually adapted to pick up each of said signals with a time-displacement determined by the relative orientation of said devices with reference to the direction of each of said plurality of sources, a signal-indicating apparatus including means for scanning a predetermined area at a predetermined scanning frequency and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a plurality of two-dimensional signal patterns determined by the time-displacement of said applied signals and individually representing the relative orientation of said devices with reference to the direction of one of said plurality of sources, and means for adjusting said scanning frequency to cause said apparatus to produce a predetermined signal pattern representing the relative orientation of said devices with reference to the direction of said particular one of said plurality of sources.

18. A direction finder for determining the direction of a particular one of a plurality of sources of radiated periodic signals comprising, a plurality of spaced pick-up devices individually adapted to pick up each of said signals with a time-displacement determined by the relative orientation of said devices with reference to the direction of each of said plurality of sources, a signal-indicating apparatus including means for scanning a predetermined area in a field of parallel lines at a predetermined line-scanning frequency and for producing within said area an indication of any signal applied to said apparatus over a period of time considerably longer than the period of said signal, the position of said indication within said area being determined by the time of application of said signal with reference to the scanning of said area, means for applying the signals picked up by said devices to said apparatus to cause said apparatus to produce a plurality of two-dimensional signal patterns in said field individually comprising parallel rows of signal indicia and individually representing the relative orientation of said devices with reference to the drection of one of said plurality of sources, and means for adjusting the line-scanning frequency of said apparatus to cause said apparatus to produce a predetermined signal pattern comprising parallel vertical rows of signal indicia representing the relative orientation of said devices with reference to the direction of said particular one of said plurality of sources.

19. A direction finder for determining the location of a source of radiated periodic signals comprising, a first plurality of pick-up devices, a second plurality of pick-up devices spaced a predetermined distance from said first-mentioned plurality, the pick-up devices of each of said pluralities being spaced with respect to each other and being individually adapted to pick up said signals with a time-displacement determined by the relative orientation of said devices with reference to the direction of said source, signal-indicating apparatus including means for scanning a predetermined area and for producing within said area an indication of any signal applied to said apparatus over a period of time considerably longer than the period of said signal, the position of said indication within said area being determined by the time of application of said signal with reference to the scanning of said area, and means for applying the signals picked up by each of said pluralities of devices to said apparatus to cause said apparatus to produce a pair of two-dimensional signal patterns determined by the time-displacement of said applied signals and individually representing the relative orientation of the devices of each of said pluralities with reference to the direction of said source.

20. A direction finder for determining the location of a source of radiated periodic signals comprising, a first plurality of pick-up devices, a second plurality of pick-up devices spaced a predetermined distance from said first-mentioned plurality, the pick-up devices of each of said pluralities being spaced with respect to each other and being individually adapted to pick up said signals with a time-displacement determined by the relative orientation of said devices with reference to the direction of said source, signal-indicating means comprising a pair of signal-indicating apparatus each of which includes means for scanning a predetermined area and for producing within said area an indication of any signal applied to said apparatus over a period of time considerably longer than the period of said signal, the position of said indication within said area being determined by the time of application of said signal with reference to the scanning of said area, and means for respectively applying the signals picked up by each of said pluralities of devices to one of said apparatus to cause each apparatus to produce a two-dimensional signal pattern determined by the time-displacement of said applied signals and representing the relative orientation of the devices of one of said pluralities with reference to the direction of said source.

HAROLD M. LEWIS.